(12) United States Patent
Wood et al.

(10) Patent No.: US 6,463,690 B1
(45) Date of Patent: Oct. 15, 2002

(54) STEAM JET PROPELLED WATERFOWL DECOY

(76) Inventors: Howard Herman Wood, 7315 Bethel Rd., Rickreall, OR (US) 97371; Linda Jeanne Wood, P.O. Box 198, Lafayette, OR (US) 97127

( * ) Notice: Subject to any disclaimer, the term of this patent is extended or adjusted under 35 U.S.C. 154(b) by 0 days.

(21) Appl. No.: 09/658,528

(22) Filed: Sep. 9, 2000

Related U.S. Application Data

(60) Provisional application No. 60/153,250, filed on Sep. 10, 1999.

(51) Int. Cl.[7] .............................................. A01M 31/06
(52) U.S. Cl. ................................................ 43/2; 43/3
(58) Field of Search ............................................ 43/3, 2

(56) References Cited

U.S. PATENT DOCUMENTS

| | | | |
|---|---|---|---|
| 4,128,958 A | 12/1978 | Snow | 43/3 |
| 4,599,819 A | 7/1986 | Voges, Jr. et al. | 43/3 |
| 4,674,219 A | 6/1987 | Chargo et al. | 43/3 |
| 5,231,780 A | 8/1993 | Gazalski | 43/3 |
| 5,377,439 A | * 1/1995 | Roos et al. | 43/3 |
| 5,566,491 A | 10/1996 | Phillips | 43/3 |
| 5,775,022 A | 7/1998 | Sumrall et al. | 43/3 |
| 5,809,683 A | 9/1998 | Solomon | 43/3 |

* cited by examiner

*Primary Examiner*—Peter M. Poon
*Assistant Examiner*—Bethany L Griles

(57) ABSTRACT

A moving, floating waterfowl decoy propelled by a steam jet motor and used by hunters to attract waterfowl to the hunting area. The device is an addition to a standard commercial hollow floating waterfowl decoy of any species. The steam jet motor is powered by combustion of fuel and has no moving parts. The steam jet propulsion system provides lifelike natural movement, wakes, ripples and splashes to enhance attraction of a decoy set.

2 Claims, 4 Drawing Sheets

STEAM JET PROPELLED WATERFOWL DECOY

This application claims the benefit of provisional application No. 60/153,250, filed Sep. 10, 1999.

BACKGROUND—TECHNICAL FIELD OF INVENTION

This invention relates to floating waterfowl decoys, specifically to self-propelled decoys which imitate the swimming motions of live waterfowl.

BACKGROUND—DESCRIPTION OF PRIOR ART

Floating waterfowl decoys are used in the hunting of ducks and geese to attract waterfowl into the hunting area. Though the appearance of these decoys is quite lifelike, on calm days they do not provide the attraction that live, moving ducks would. Many animated decoy models have been built to address this problem of stationary decoys, and all have substantial drawbacks.

Decoys which produce ripples and some slight movement in the water have been animated by battery-powered vibrators or air pumps. These models improve on the completely motionless decoy, but are still not lifelike, as they do not swim or change the configuration of the decoy set, nor do they create v-shaped wakes in the water in the manner of a live waterfowl. They also have operational problems. All battery-powered motors in floating decoys present difficulties with changing batteries in cold, dark conditions, corrosion of contacts, poor battery performance in low temperatures and cost of replacement batteries. Air pump models are tethered to the shore by their air lines and require constant attention of the hunter (whom they occasionally trip!) in their operation.

Several swimming decoys have been invented. These imitate a living duck much more closely, providing good attraction on calm days when there is no other motion in the decoy set. Their drawbacks are largely functional. These models have various methods of propulsion and power, each with its own difficulties. Propeller-driven models can provide lifelike movement, but are prone to the same battery problems as mentioned above, and are often entangled in the weeds of the shallow, marshy hunting ponds where they are used. In order to be lightweight enough to get substantial operating time from a set of batteries, the drive apparatus must be of light, fragile construction and often these models are not durable in the difficult conditions of decoy bags, boats and backpacks where they are stored and carried.

Some swimming models have used a battery powered water jet for propulsion. These have the same battery-related problems previously mentioned, and frequently suffer plugged intake ports from mud and plant matter in the swampy water in which they operate. In order to be effective, a moving decoy needs to operate trouble-free independent from the hunter for extended periods of time. Several recent inventions in this field have featured moving wings or feet or both. Though these motions are not very lifelike, wing-flapping and foot splashing can be effective in attracting flying birds at long distances. The apparatus tends to repel birds at the closer distances of "shooting range", especially after the batteries pass their peak of power and the motion starts slowing down. The mechanisms by which they move are complex, require substantial assembly by the hunter, and are much too delicate for field conditions. The cost of flapping and kicking decoys is beyond many hunters, and they do not hold up well in actual use.

Radio controlled models are to delicate and expensive for practical use, and many the mechanical difficulties discussed above may apply, depending on the method of propulsion. The main problems found in researching moving, floating waterfowl decoys were: fragility, need for substantial hunter field assembly and attention, plugging and entangling of parts, battery problems of expense, inconvenience and corrosion, and expense to produce the decoy.

One of the best attempts to solve these difficulties is the decoy by Sumrall, U.S. Pat. No. 5,775,027, which uses a detachable base to house the apparatus for a sculling propeller. The sculling blade or fin of this decoy does protrude outside the base of the decoy, however, and is still quite prone to entanglements. The base and decoy body must still be assembled by the hunter in the cold, dark pre-hunt conditions, as it is not sturdy enough to survive long in a decoy bag full of wet, jostling decoys and weighted lines. The design is quite complex, and the resulting commercial product is expensive, out of the price range of many duck hunters. Battery problems also are inherent in this model.

OBJECTS AND ADVANTAGES

This decoy system is unique over prior art in its simplicity of design and operation. There are no moving parts to break, no mechanical joints or bearing surfaces, and no mechanical connections to wear or jam. It is powered by inexpensive fuel rather than electricity and so avoids problems of corrosion of electrical connections, stabilization of heavy batteries and high replacement costs of batteries. The decoy system is of single-unit construction and requires no assembly to put into use. This is crucial under the cold, dark, conditions of waterfowl hunting. It has no mechanical protrusions beyond the outer surface of the decoy to break off when stored in a decoy bag. The smooth, moderate motion produced by the jet motor is characteristic of the natural gliding movement for which ducks, geese and swans are famous. This moving decoy can be produced by modifying existing hollow shell floating decoys or manufactured directly with minimum modifications to an existing production decoy shell. Its apparatus is simple, low cost and easily assembled, and so the retail product will be inexpensive to produce. The simplicity of the design also improves durability, since, with no moving parts or joints in the propulsion assembly, there is nothing to bend, break or fail. Numerous advantages over prior art are realized by utilization of a pulsating steam boiler to propel a waterfowl decoy. These advantages are inherent in the very nature of the propulsion system. A drop of water converted by heat to steam displaces approximately 1700 times the volume of the original drop of water. The pulsating steam boiler consists of two tubes starting just below water level and extending into a boiler chamber where heat is applied. When heated, the boiler chamber expands, causing pressure gradient that pulls water into the boiler chamber. Water reaching the hot boiler "flashes" into steam, expands tremendously and forces a jet of water out of the tubes, at the same time cooling the metal and the water vapor within the tubes, which draws another charge of water into the chamber to repeat the cycle. This process results in a net forward thrust, as a relatively low velocity intake of water is coupled with a much more vigorous jet thrust or exhaust.

The inherent characteristics of this propulsion method solve a host of problems experienced in prior art. Since it requires no drive axles, no moving parts with bearing surfaces (above or below water line) and tends to clear potential clogging of the jet tubes as it cycles, it avoids many of the operational and attraction problems of moving decoys to date. Needless to say, the difficulties associated with battery use are not an issue. None of the parts of this propulsion system are particularly corrosion. No delicate moving parts means no field assembly by the hunter and fewer potential breakdown points. Wrapping of weeds around protruding propellers or jet units does not happen, since there are no substantial protrusions from the decoy shell below the water line. The decoy may be carried in a decoy bag with other decoys without special protections, as it has no external parts to snap off or bend.

Since there are no protrusions beyond the decoy other than an unobtrusive vent on the top of the decoy, appearance at close range is natural. The natural, gliding movement of ducks, geese and swan is duplicated precisely by the head-up, swimming decoy. The jerky, circular motion of the head-down, feeder decoy also very closely resembles the natural feeding motion of waterfowl. Since all appearance and motions are realistic, waterfowl are at no point repelled by the decoy and will join it as one of their own, even after landing. The simplicity of this propulsion system allows for an uncomplicated modification of an existing decoy shell, which should result in low-cost production. Components are inexpensive and easy to assemble. This decoy will be retailed at the lower end of current market prices for moving decoys.

SUMMARY

A mechanism which propels a floating waterfowl decoy and the modifications to a decoy shell which make installation and operation of that mechanism possible. Propulsion is produced by a steam jet motor which requires no moving parts other than metal expansion and contraction. The mechanism can be installed in virtually any rigid to semi-rigid hollow to semi-hollow floating waterfowl decoy. The preferred embodiment is a swimming upright decoy, with feeding duck decoy as another embodiment.

Figure 1:
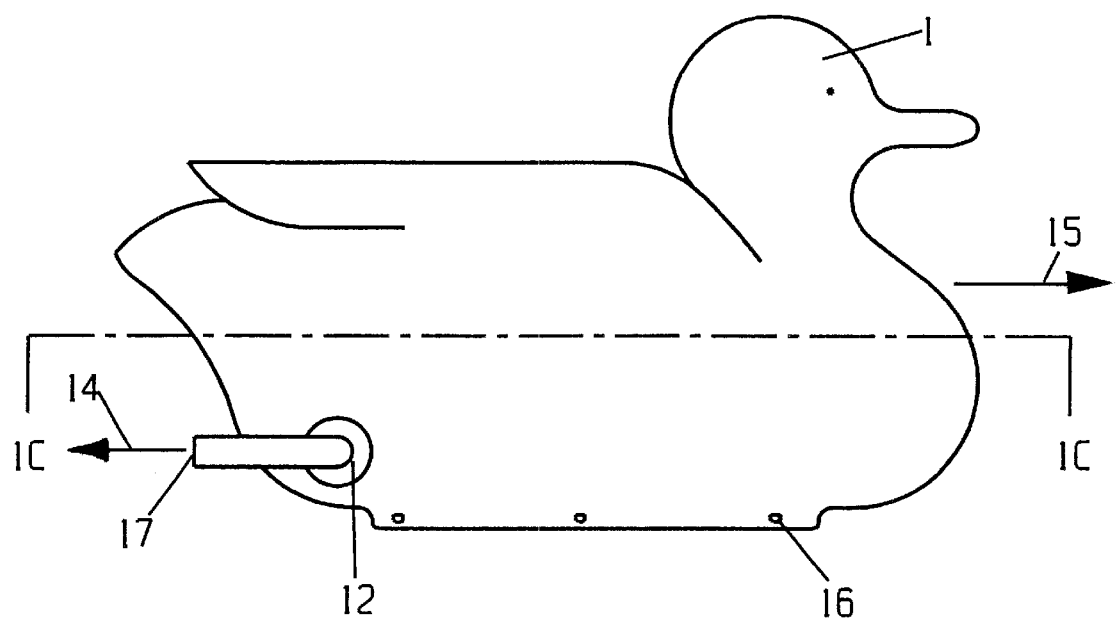
FIG. 1 is a perspective view of the preferred embodiment of the Steam Jet Propelled Waterfowl Decoy.
Figure 1C:
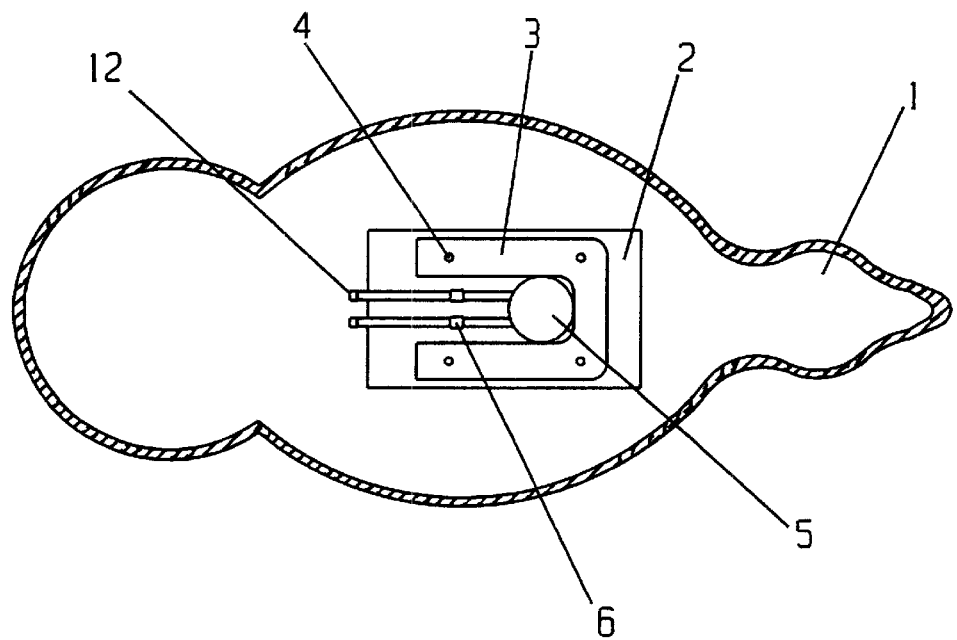
FIG. 1C is a sectional view taken on line 1C—1C of FIG. 1 showing the position of the mounting platform for the internal mechanisms.
Figure 1A:
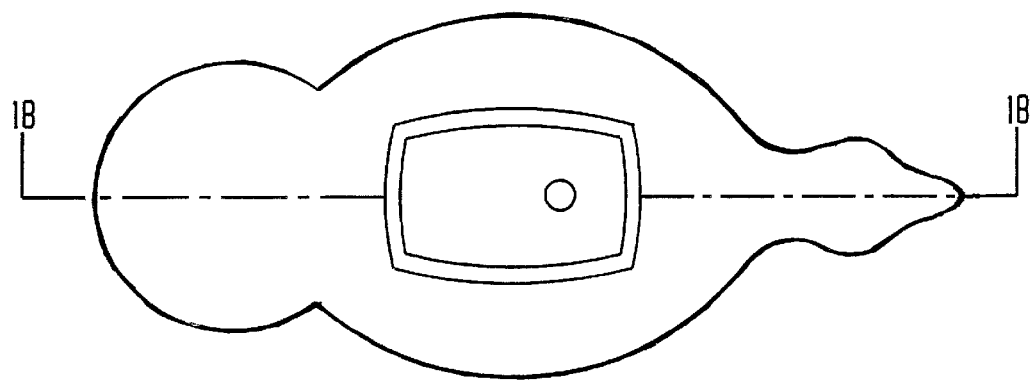
FIG. 1A is a top view of the decoy body.
Figure 1B:
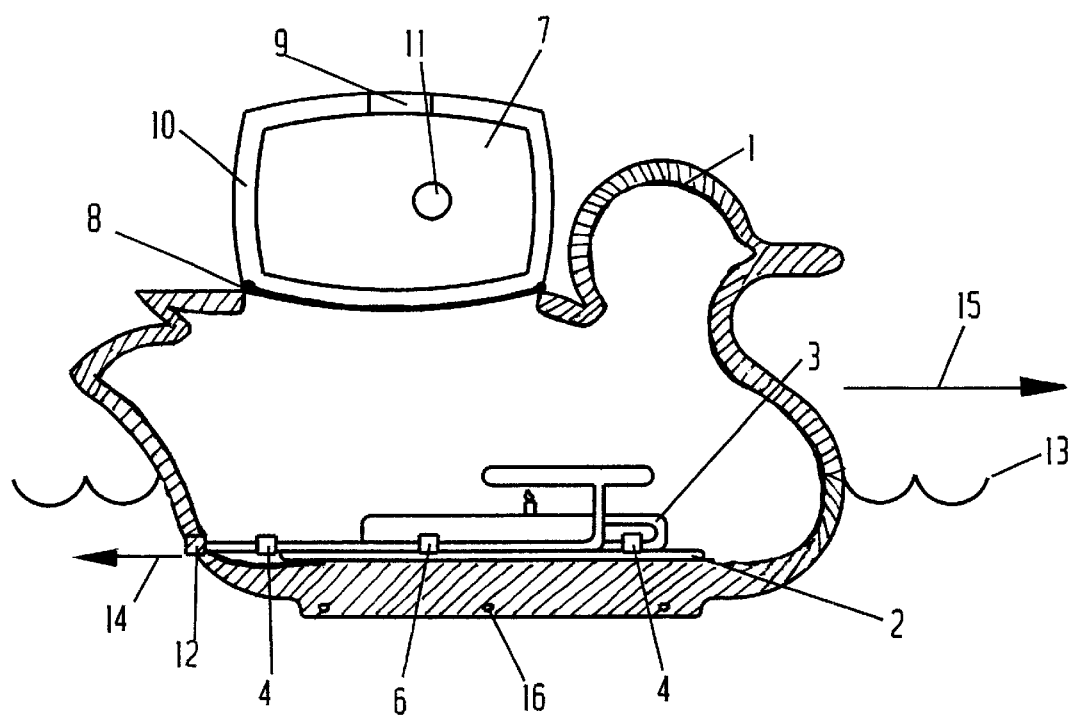
FIG. 1B is a sectional view taken on line 1B—1B of FIG. 1A showing internal mechanisms of the preferred embodiment.

REFERENCE NUMERALS IN DRAWINGS 1 rigid to semi-rigid hollow or partially hollow commercial floating waterfowl decoy
2 rigid steam jet power assembly mounting platform with fasteners
3 fuel container-burner unit
4 fuel container-burner unit fasteners
5 steam jet motor unit with steam tubing
6 anterior steam jet motor fasteners
7 access hatch
8 access hatch hinge
9 access hatch latch
10 access hatch water-repellent overlapping seal
11 vent
12 waterproof grommet
13 water surface
14 jet thrust
15 forward motion produced by jet thrust
16 tether point
17 terminus of steam jet tubing Description—FIG. 1, Preferred Embodiment The preferred embodiment of the steam jet propelled floating decoy is shown in FIG. 1 (perspective view of decoy), FIG. 1A (top view), FIG. 1B (sectional view cut away to show interior apparatus) and FIG. 1C (sectional top view showing mounting platform). A rigid to semi-rigid commercial floating waterfowl decoy 1 of hollow or partially hollow construction with a rigid power assembly mounting platform 2 glued to the interior floor of the decoy, from the stern forward. Fuel container-burner unit 3 is attached to the upper surface of mounting platform 2 by fuel container fasteners 4. Steam jet motor unit with steam tubing 5 is held to upper surface of mounting platform 2 with releasably rigid fasteners 6 and distal ends of tubing extend through waterproof grommets 12 to a position flush with the exterior surface of the decoy shell at the stern of the decoy below the water's surface. Access hatch 7 is located on the superior surface of the decoy hull, is oblong in shape, and comprises hinges 8 along left side, water repellent seal 10 bordering remaining three sides and latch 9 on right side. Vent 11 pierces hatch 7, directly above burner unit 3. Steam and water exiting the terminus 17 of steam jet motor tubing at the stern of the decoy below the water line provide jet thrust 14 and resulting forward motion 15. Tether 16 is an attachment point on the centerline of the lower exterior surface of the decoy hull.

Operational Description

A rigid to semi-rigid commercial floating waterfowl decoy 1 of hollow or partially hollow construction with a rigid power assembly mounting platform 2 glued with a thick layer of flexible glue to the interior floor of the decoy. Mounting platform 2 serves to streamline assembly procedures and to stabilize the means of propulsion within the moving decoy. Fuel container-burner unit 3 is attached to the platform by fuel container fasteners 4. Steam jet motor unit with tubing 5 is held to the platform with releasably rigid fasteners 6, and these fasteners are releasable for servicing of the steam jet motor unit. Waterproof grommets 12 stabilize the distal end of the tubing 17 and seal water out of the decoy shell. Access hatch 7 provides access to the interior of the decoy for purposes of refueling the jet steam motor, has hinges 8 and is bordered by material which overlaps decoy shell adjacent to it to provide a water repellent seal 10 when latch 9 is engaged. Vent 11 has an overhanging cap to protect the interior of the decoy from rain and splashing water and provides for gaseous exchange when burner is in operation. Steam and water exiting the steam jet motor tubing at the stern of the decoy below the water line provide jet thrust 14 and resulting forward motion 15 of the decoy. Tether 16 allows for attachment of an anchor line or mooring line to control the decoy's area of motion.

Method of Use
1. Attach decoy tether 16.
2. Open access hatch 7
3. Fill fuel container 3
4. Charge steam tubes 5 with water using syringe 5. Place decoy in water
6. Light burner 3
7. Close access hatch 7

Figure 2:
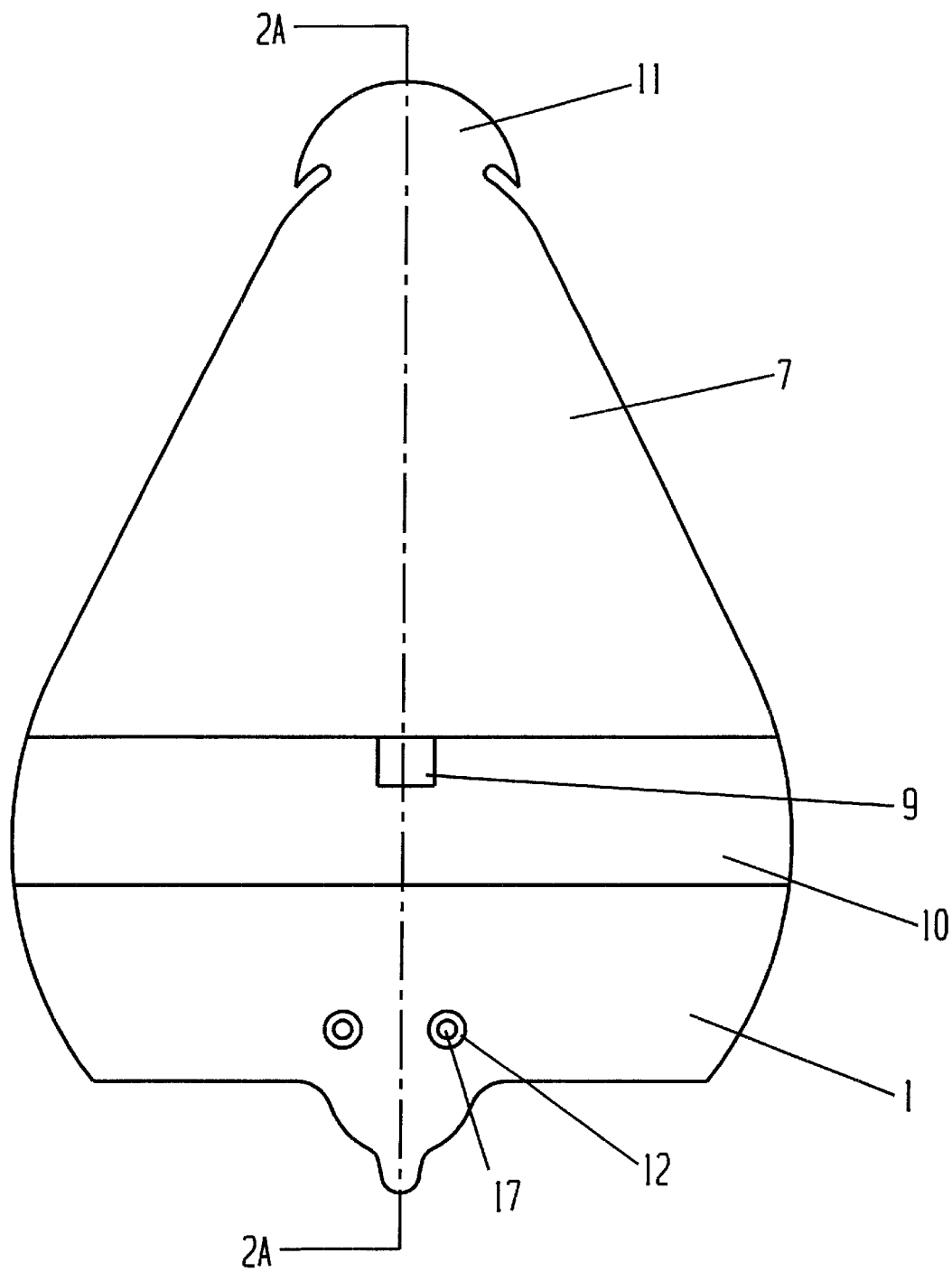
FIG. 2 is a rear view of the Steam Jet Propelled Waterfowl Decoy in a feeding decoy shell.
Figure 2A:
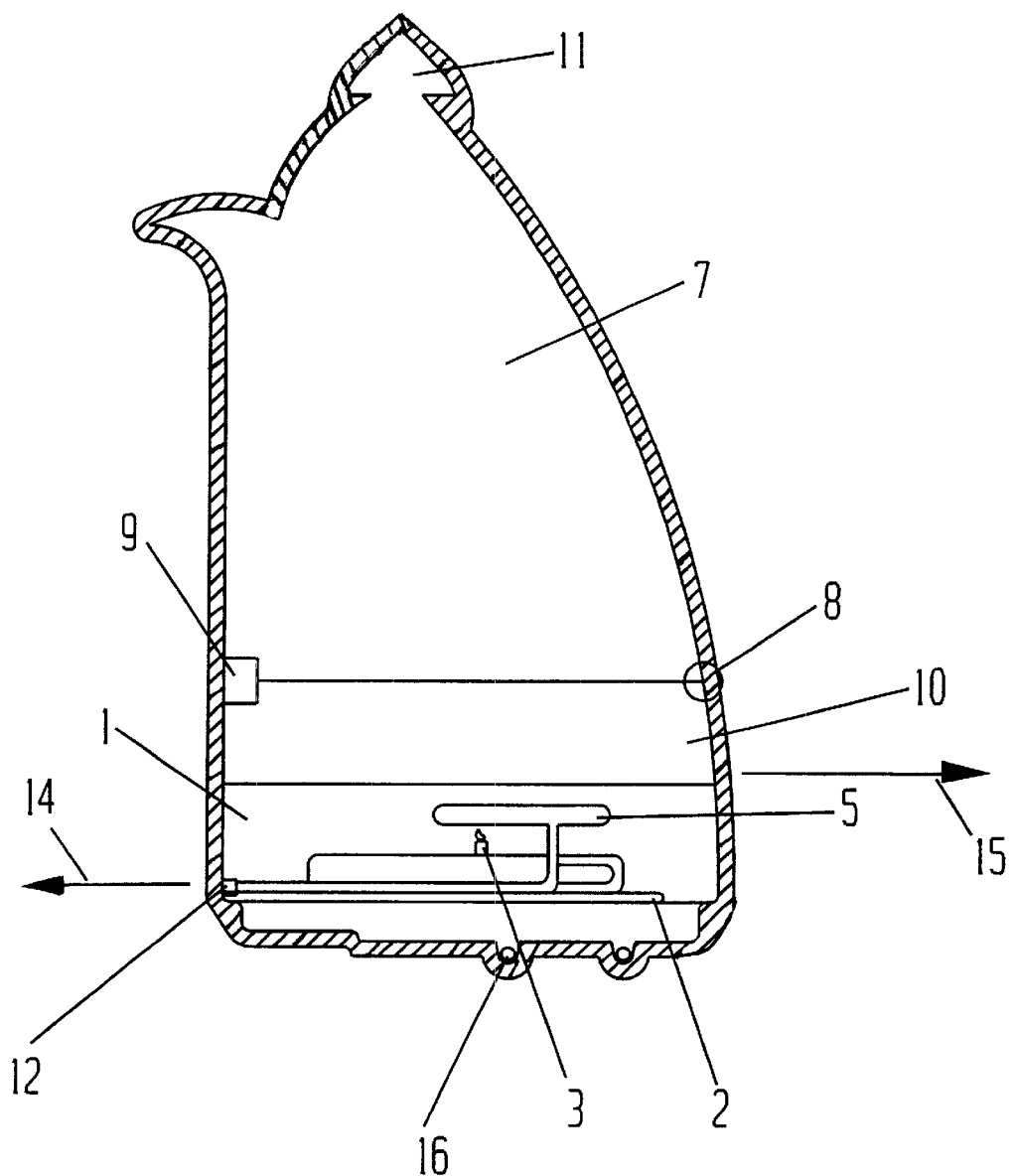
FIG. 2A is a sectional view taken on line 2A—2A of FIG. 2, showing internal mechanisms and placement within feeding decoy shell.

Description of Alternate Embodiment—FIGS. 2, 2A

An alternate embodiment of the steam jet propelled waterfowl decoy is shown in FIG. 2 (rear view) and 2A (sectional view showing interior mechanisms). The positioning of the power assembly mounting platform 2 and propulsion components 3,4,5,6,12 are as described for FIG. 1, the preferred embodiment. The access hatch 7 for this embodiment comprises the upper half of the decoy. Access hatch hinge 8 is located at the front of the decoy, with the access hatch latch 9 at the stern. Vent 11 is located on the decoy wingtip directly above burner unit 3. Terminus of the steam jet tubing is indicated by 17.

FIG. 2—Operational Description

Operation of the steam jet propelled feeding decoy is identical to operation of the preferred embodiment.

Conclusions, Ramifications and Scope

The reader will see that the Steam Jet Propelled Waterfowl Decoy system may be used to animate most floating duck, goose or swan decoys currently on the market with the natural, graceful gliding motion for which this genus of game birds is famous. The power mechanism is easy to install and operate and has virtually no moving parts to wear, tangle or foul, and no exterior mechanical protrusions to break or tangle in field use. While the above description contains many specificities, these should not be construed as limitations on the scope of this decoy system, but rather as an exemplification of one preferred embodiment thereof. Many variations are possible. The power can be increased or decreased by varying boiler number or design or burner adjustment to provide sufficient power to move any normal size waterfowl decoy. Multiple decoys may be propelled by the same power unit, utilizing a towing line. The simplicity of this decoy system lends itself readily to customer installation, requiring no specialized tools or techniques, and so could be packaged as a kit for home installation into the purchaser's decoy shell. The jet thrust from the steam motor creates water currents which can be harnessed to provide additional attractants. In addition, by diverting the flow of the jet thrust, spurts of water could be projected from the stern of the decoy to resemble splashes made by a feeding waterfowl. The jet thrust provided can also be used to provide wing or head movement, though these variations would require external moving parts, which would be undesirable. The range of motion can be easily varied to fit different pond configurations. A monofilament line attached to two underwater stakes with a snap swivel between the decoy and the staked line can provide a sweeping path of motion to change the decoy set dramatically. The decoy may also be tethered by a screw eye on the back leading up to a stake to avoid tether entanglements. This decoy will work with a number of other commonly used tethering systems. The scope of the invention should be determined by the appended claims and their legal equivalents, rather than by the embodiments and examples given.

What is claimed is:

1. A steam propelled floating wildfowl decoy having a stern and an internal means of propulsion to provide continuous motion and ripples on the surface of a body of water within a hunting decoy group, comprising:
    a) a steam motor device sufficient in power to propel a decoy of species and size selected at a speed desired and having waterproof grommets in a wall of the decoy through which tubing extends from the steam motor device to an exterior of the decoy below the surface of the water;
    b) a rigid to semi-rigid hollow or partially hollow floating decoy with an access hatch to allow service to said means of propulsion and venting for gaseous exchange and holes which accommodate said grommets and tubing at said stem below said water surface;
    c) a means to apply heat to an underside of said steam motor device and fasteners to secure said means to apply heat to an interior surface of the decoy shell, whereby the decoy will be propelled across the surface of the water providing natural forward motion and ripples to the decoy group.

2. The steam propelled floating waterfowl decoy according to claim 1, wherein a means of steam propulsion, a vent means and hatch hardware are packaged as a kit for home installation into a decoy shell.

* * * * *

UNITED STATES PATENT AND TRADEMARK OFFICE
Certificate

Patent No. 6,463,690 B1

Patented: October 15, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Howard Herman Wood, Rickreall, OR.

Signed and Sealed this Twenty-third Day of September 2003.

PETER M. POON
*Acting Supervisory Patent Examiner*
Art Unit 3643